United States Patent [19]

Robeson

[11] Patent Number: 4,777,223

[45] Date of Patent: Oct. 11, 1988

[54] ADDITION OF POLYHYDROXYETHER TO BLENDS OF A POLYARYLATE AND A POLYAMIDE

[75] Inventor: Lloyd M. Robeson, Whitehouse Station, N.J.

[73] Assignee: Amoco Corporation, Chicago, Ill.

[21] Appl. No.: 878,600

[22] Filed: Jun. 26, 1986

[51] Int. Cl.$^4$ .................. C08L 77/02; C08L 77/06; C08L 67/00; C08L 63/02

[52] U.S. Cl. ..................... 525/423; 525/425; 525/397

[58] Field of Search ............ 524/538; 525/397, 423, 525/425

[56] References Cited

U.S. PATENT DOCUMENTS

| | | | |
|---|---|---|---|
| 3,920,602 | 11/1975 | Freed | 525/423 |
| 3,953,649 | 4/1976 | Suzuki | 525/423 |
| 4,254,242 | 3/1981 | Kyo | 524/538 |
| 4,340,697 | 7/1982 | Aya | 525/397 |
| 4,614,773 | 9/1986 | Sugio | 525/397 |

FOREIGN PATENT DOCUMENTS

| | | | |
|---|---|---|---|
| 51-31954 | 9/1976 | Japan | 525/397 |
| 57-126844 | 8/1982 | Japan | 524/538 |
| 57-190042 | 11/1982 | Japan | 524/538 |
| 59-179556 | 10/1984 | Japan | 525/397 |

*Primary Examiner*—C. Warren Ivy
*Attorney, Agent, or Firm*—Janice M. McLain; William H. Magidson; Ralph C. Medhurst

[57] ABSTRACT

Described herein is the addition of polyhydroxyethers to blends of polyarylate and polyamide. The resulting blend results in significant increases in ultimate elongation, tensile strength, notched izod impact strength, tensile impact strength, and injection molded material uniformity.

8 Claims, No Drawings

ADDITION OF POLYHYDROXYETHER TO BLENDS OF A POLYARYLATE AND A POLYAMIDE

FIELD OF THE INVENTION

This invention relates to the addition of a polyhydroxyether to a blend of polyarylate and polyamide. The resulting blend may be formed into articles which have significant increases in ultimate elongation, tensile strength, notched izod impact strength, tensile impact strength and injection molded material uniformity.

BACKGROUND OF THE INVENTION

Polyarylates are aromatic polyesters derived from a dihydric phenol, particularly 2,2-bis(4-hydroxyphenyl)-propane also identified as Bisphenol A, and an aromatic dicarboxylic acid, particularly mixtures of terephthalic and isophthalic acids. These polyarylates are high temperature, high performance thermoplastic polymers with a good combination of thermal and mechanical properties. Polyarylates may be formed into a variety of articles.

In order to enhance the properties of polyarylate for specific end-use applications, polyarylates have been blended with a number of other polymers.

Blends of polyarylate and polyamides, such as nylon 6 and nylon 6,6, are well known in the art and some are commercially available. These blends have been used primarily in electrical and electronic applications. However, these blends have marginal mechanical compatibility which limits their use in many end use applications.

THE INVENTION

It has now been found that the addition of a polyhydroxyether to a blend of a polyarylate and a polyamide yields significant increases in mechanical properties such as ultimate elongation, tensile strength, notched izod impact strength, tensile impact strength and injection molded material uniformity.

Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

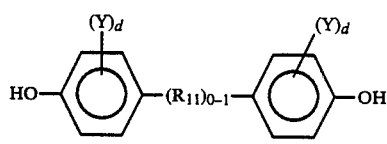

wherein Y is independently selected from, hydrogen, alkyl groups of 1 to 4 carbon atoms, chlorine or bromine, each d, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms. O, CO, $SO_2$, or S.

The dihydric phenols may be used individually or in combination.

The dihydric phenols that may be used in this invention include the following:
2,2-bis-(4-hydroxyphenyl)propane,
2,2-bis (3,5-dimethyl 4-hydroxyphenyl) propane,
bis-(2-hydroxyphenyl)methane,
bis-(4-hydroxyphenyl)methane,
bis-(4-hydroxy-2,6-dimethyl-3-methoxyphenyl) methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl 4-hydroxyphenyl)propane,
2,2-bis-(3-isopropyl-4-hydroxyphenyl) propane,
2,2-bis-(2-isopropyl-4 hydroxyphenyl) propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis (phenyl) propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and naphthalene diols The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

Polyamides

The polyamide polymers which may be used herein are well known in the art. The types of polyamides suitable for use in this invention include both amorphous and semicrystalline materials.

The polyamide polymers include homopolymers as well as copolymers. These polymers may be formed by conventional methods from the condensation of bifunctional monomers, by the condensation of diamines and dibasic acids, as well as by addition polymerization. Numerous combinations of diacids, such as carbonic acid, oxalic acid, glutaric acid, adipic acid, pimelic acid, suberic acid, azelaic acid, sebacic acid, dodecanedioic acid, isophthalic acid, terephthalic acid, and the like, diamines, such as hydrazine, ethylenediamine, hexamethylenediamine, 1,8-octanediamine, piperazine, and the like, and amino acids are possible. The chains between functional groups in the reactants may comprise linear or branched aliphatic hydrocarbons, or alicyclic or aromatic rings. They may also contain hetero atoms such as oxygen, sulfur, and nitrogen. Secondary diamines lead to the formation of N-substituted polyamides.

Also, included herein are the aromatic polyamide polymers which are aromatic in both the diamine and the dibasic acid. The dibasic acids include terephthalic acid, isophthalic acid, phthalic acid, and the like. The aromatic diamines include o-phenylenediamine, 2,4-diaminotoluene, 4,4'-methylenedianiline, and the like.

The polyamide polymers are prepared by methods well known in the art, such as by direct amidation which is the reaction of amine groups with carboxyls accompanied by elimination of water; low temperature polycondensation of diamines and diacid chlorides, ring-opening polymerization, addition of amines to activated double bonds, polymerization of isocyanates and reaction of formaldehyde with dinitriles.

The polyamide polymers include
polyhexamethylene-adipamide, i.e., nylon 6,6;
poly($\epsilon$-caprolactam), i.e., nylon-6;
polypropiolactam, i.e., nylon-3;
poly(pyrrolidin- 2-one), i.e., nylon-4;
poly($\omega$-enanthamide), i.e., nylon-7;
polycapryllactam, i.e., nylon-8;
poly($\omega$-pelargonamide), i.e., nylon-9;
poly(11-aminodecanoic acid), i.e., nylon-10;
poly($\omega$-undecaneamide), i.e., nylon-11;
polyhexamethyleneterephthalamide, i.e., nylon-6,T, nylon 6,10, and the like.

Polyhydroxyethers

The thermoplastic polyhydroxyethers which may be used herein have the following general formula:

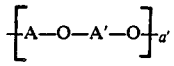

where A is the radical residuum of a dihydric phenol, A' is a radical residuum of an epoxide selected from mono- and diepoxides and which contain from 1 to 2 hydroxyl groups, and a' is an integer which represents the degree of polymerization and is at least about 2 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

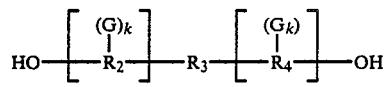

wherein the $R_2$'s are independently an aromatic divalent hydrocarbon radical, such as naphthylene and phenylene with phenylene being preferred, the G's may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, the k's are independently integers of 0 to 4, $R_3$ is independently selected from a divalent saturated aliphatic hydrocarbon radical particularly alkylene or alkylidene radicals having from 1 to 8 carbons atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula: wherein G and k are as previously defined, and $R_4$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

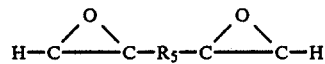

wherein $R_5$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

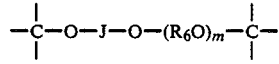

wherein $R_6$ is a divalent organic radical, J is a divalent aromatic radical residuum of a dihydric phenol, such as those listed above in the description of dihydric phenols, and m is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,924,747; and 2,777,051.

The polyarylate is used in amounts of from about 15 to about 85 weight percent, preferably from about 25 to about 75 weight percent, the polyamide is used in amounts of from about 15 to about 85 weight percent, preferably from about 25 to about 75 weight percent, and the polyhydroxyether in amounts from about 0.5 to about 15 weight percent, preferably from about 2 to about 10 weight percent.

Other Additives

The blends of this invention may contain other polymers including polyesters such as poly(ethylene terephthate) or poly (butylene terephthalate) or polyesters which are derived from a cycloaliphatic diol and an aromatic dicarboxylic acid, particularly the reaction of either the cis or trans-isomer of 1,4-cyclohexanedimethanol with a mixture of isophthalic and terephthalic acids or the reaction of 1,4-cyclohexanedimethanol and ethylene glycol with terephthalic acid. These polyesters are well known in the art and are described in, for example, U.S. Pat. No. 2,901,466.

The blend may also contain an impact modifier which is a graft copolymer of a vinyl aromatic, an acrylate, an unsaturated nitrile, or mixtures thereof, grafted onto an unsaturated elastomeric backbone and having a tensile modulus (ASTM D-638) of less than 100,000 psi. This impact modifier is fully described in U.S. Pat. No. 4,231,922.

The blends of this invention may contain other ingredients such as stabilizers, i.e., metal oxides such as zinc oxide, antioxidants, flame retardants, pigments, reinforcing fibers, inorganic fillers, and the like. Preferably, the composition contains fibers and/or inorganic filters.

The reinforcing fiber includes fiberglass, carbon fibers, and the like, and mixtures thereof. The particulate inorganic fillers which may be used include wollastonite, calcium carbonate, glass beads, talc, mica and the like, or mixtures thereof.

EXAMPLES

The following Examples serve to give specific illustrations of the practice of this invention but they are not intended in any way to limit the scope of this invention.

Control A

Fifty weight percent of a polyarylate (prepared from bisphenol-A and a mixture of 50 mole percent each of terephthalic and isophthalic chlorides having a reduced viscosity of 0.64 dl/g as measured in p-chlorophenol at 49° C., (Ardel D-100 obtained from Union Carbide Corporation) and 50 weight percent of nylon 6,6 (Zytel 42 obtained from E.I. DuPont de Nemours & Company) having a melting point of 255° C. (as measured by ASTM D-789), a specific gravity of 1.14 (as measured by ASTM D-792) and a flexural modulus of 410,000 psi, dry 23° C. (as measured by ASTM D-790) in a one inch laboratory extruder having a 24 L/D at a temperature of 270° C. to 290° C. and pelletized. The resultant blend was then injection molded into test specimens using a 1¼ ounce Newbury injection molding machine. The samples were tested for the following mechanical properties:

ASTM D-638 Tensile Modulus, Tensile Strength, Percent Elongation.
ASTM D-256 Notched Izod Impact Strength
ASTM D-1822 Tensile Impact Strength
ASTM D-648 Heat Deflection Temperature The results are shown in Table I.

EXAMPLE 1

The procedure of Control A was repeated except that 45 weight percent of the polyarylate of Control A was blended with 45 weight percent of the nylon 6,6 of Control A and 10 weight percent of a polyhydroxyether which is the reaction product of bisphenol-A and epichlorohydrin (having a reduced viscosity of 0.43 dl/g as measured as 0.2 g/100 ml in tetrahydrofuran at 25° C., PKHH sold by Union Carbide Corporation).

The results are shown in Table I.

EXAMPLE 2

The procedure of Control A was repeated except that 40 weight percent of the polyarylate of Control A was blended with 40 weight percent of the nylon 6,6 of Control A, 10 weight percent of the polyhydroxyether of Example 1 and 10 weight percent of a styrene/acrylate/butadiene terpolymer (KM -611 sold by Rohm & Haas Company having a tensile modulus (ASTM D-638) of 43,000 psi).

The results are shown in Table I.

As can be seen from the data in Table I, the addition of polyhydroxyether to the blend results in a significant improvement in ultimate elongation, tensile strength, and notched impact strength.

TABLE I
EFFECT OF POLYHYDROXYETHER ADDITION ON POLYARYLATE/NYLON BLENDS

| Example | Description of the Composition Polymer (Wt. %) | Tensile Modulus (psi) | Tensile Strength (psi) | Elongation (%) | Notched Izod Impact Strength (ft lb/in of notch) | Tensile Impact Strength (ft lbs/in$^2$) | Heat Distortion Temperature (°C.) 264 psi: ⅛" bar |
|---|---|---|---|---|---|---|---|
| Control A | Polyarylate (50) Nylon (50) | 300,000 | 8,290 | 3.4 | 0.53 | 55 | 109 |
| 1 | Polyarylate (45) Nylon (45) PHE[1] (10) | 305,000 | 10,000 | 33 | 1.27 | 100 | 93 |
| 2 | Polyarylate (40) Nylon (40) PHE (10) KM-611 (10) | 286,000 | 8,770 | 40 | 2.56 | 93 | 93 |

[1]PHE = polyhydroxyether
*Measured after several weeks at 50% R.H.

Control B

The procedure of Control A was repeated except that 50 weight percent of a blend* of the polyarylate of Control A and a copolyester (PETG-6763, a polyester prepared by the reaction of cyclohexanedimethanol and ethylene glycol with terephthalic acid in a molar ratio of 1:2:3 having an Mn of about 26,000 and sold by Tennessee Eastman Company) was blended with 50 weight percent of the nylon 6,6 of Control A.

The results are shown in Table II.

EXAMPLE 3

The procedure of Control A was repeated except that 45 weight percent of the blend* of the polyarylate and the copolyester of Control B was blended with 45 weight percent of the nylon 6,6 of Control A and 10 weight percent of the polyhydroxyether of Example 1.

The results are shown in Table II.

The data in Table II shows that the addition of polyhydroxyether to the blend leads to an improvement in the mechanical properties.

* The ratio of polyarylate to copolyester is 67/33 by weight.

TABLE II
EFFECT OF MOLD TEMPERATURE OF POLYARYLATE/NYLON BLENDS

| Example | Description of the Composition Polymer (Wt. %) | | Tensile Modulus (psi) | Tensile Strength (psi) | Elongation (%) | Notched Izod Impact Strength (ft lb/in of notch) | Tensile Impact Strength (ft lbs/in$^2$) | Heat Distortion Temperature (°C.) 264 psi: ⅛" bar |
|---|---|---|---|---|---|---|---|---|
| Control B | Polyarylate PETG | (50) | 376,000 | 9,990 | 43 | 1.30 | 128 | 97 |
|  | Nylon | (50) |  |  |  |  |  |  |
| 3 | Polyarylate PETG | (45) | 368,000 | 10,500 | 143 | 1.35 | 177 | 97 |
|  | Nylon | (45) |  |  |  |  |  |  |
|  | PHE | (10) |  |  |  |  |  |  |

[1]PHE = polyhydroxyether

Controls C to E and Example 4 to 6

Controls C to E involved the same blend as Control B, while Examples 4 to 6 involved the same blend as Example 3. The procedure of Control A was repeated except that variations in mold temperatures were employed. The results are illustrated in Table 3. At high mold temperatures, the blend not containing phenoxy was too delaminated to test. This demonstrates another added advantage for phenoxy incorporation in that significant improvements in uniformity are observed with phenoxy addition.

TABLE III
EFFECT OF MOLD TEMPERATURE OF POLYARYLATE/NYLON BLENDS

|  | Control C | Control D | Control E | Example 4 | Example 5 | Example 6 |
|---|---|---|---|---|---|---|
| Mold Temperature, (°C.) | 50 | 80 | 110 | 50 | 80 | 110 |
| Tensile Modulus (psi) | 405,000 | 402,000 | * | 395,000 | 394,000 | 396,000 |
| Tensile Strength (psi) | 10,700 | 11,300 | * | 11,200 | 11,100 | 11,300 |
| Elongation (%) | 63 | 25 | * | 128 | 105 | 118 |
| Tensile Impact Strength (ft lbs/in$^2$) | 127 | 131 | * | 135 | 131 | 82 |
| Notched Izod Impact Strength (ft lbs/inch of notch) | 1.22 | 1.51 | * | 1.28 | 1.50 | 1.30 |
| Heat Distortion Temperature 264 psi ⅛" bar, (°C.) | 103 | 106 | * | 95 | 96 | 100 |
| Discription of the Composition polymer (wt %) | Polyarylate PETG (50) Nylon (50) | | | Polyarylate PETG (45) Nylon (45) PHE (10) | | |

*Delaminated too much to test.

What is claimed is:

1. A blend comprising only three polymers; said polymers consisting essentially of a polyarylate, a polyamide, and a thermoplastic polyhydroxy ether:

(a) from about 15 to about 85 weight percent of said three polymers consist essentially of a polyarylate polymer derived from a dihydric phenol and at least one aromatic dicarboxylic acid, and having a reduced viscosity of from about 0.4 to greater than about 1.0 dl/gm, as measured in chloroform (0.5 g/100 ml chloroform) at 25° C., (b) from about 15 to about 85 weight percent of said three polymers consist essentially of the polyamide polymer, said polyamide polymer selected from the group consisting essentially of polyhexamethyleneadipamide, poly($\epsilon$-caprolactam), polypropiolactam, poly(pyrrolidin-2-one), poly($\omega$-enanthamide), polycapryllactam, poly($\omega$-pelargonamide), poly(11-aminodecanoic acid), poly($\omega$-undecaneamide), and polyhexamethyleneterephthalamide, and (c) from about 0.5 to about 15 weight percent of said three polymers consists essentially of a thermoplastic polyhydroxyether polymer having the formula:

$$(A\text{—}O\text{—}A'\text{—}O)_a$$

wherein A is the radical residuum of a dihydric phenol, A' is a radical residuum of an epoxide selected from mono- and diepoxides, which epoxide residuum contains 1 to 2 hydroxyl groups, and a is an integer which represents the degree of polymerization and is at least about 20; or a blend comprising as the only polymers, the said three polymers in the proportions stated above in combination with a further polymer selected from the group consisting of poly(ethylene terephthalate), poly(butylene terephthalate), mixtures of said poly(ethyleneterephthalate) and said poly(butylene-terephthalate), and a polyester derived from a cycloaliphatic diol and an aromatic dicarboxylic acid.

2. A blend as defined in claim 1 wherein the dihydric phenol of (a) is of the following formula:

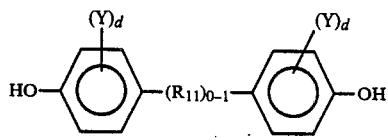

wherein Y is independently selected from hydrogen, alkyl groups of 1 to 4 carbon atoms, chlorine or bromine, each d, independently, has a value of from 0 to 4, inclusive, and $R_{11}$ is a divalent saturated or unsaturated aliphatic hydrocarbon radical having from 1 to 6 carbon atoms, or a cycloalkylidene or cycloalkylene radical having up to and including 9 carbon atoms, O, CO, $SO_2$, or S.

3. A blend as defined in claim 1 wherein the aromatic dicarboxylic acid of (a) is terephthalic acid, isophthalic acid, any of the naphthalene dicarboxylic acids and mixtures thereof.

4. A blend as defined in claim 1 wherein the polyarylate is derived from bisphenol A and terephthalic acid or isophthalic acid, or mixtures thereof.

5. A blend as defined in claim 1 wherein the polyamide is selected from nylon 6, nylon 6,6 or nylon 6,10.

6. A blend as defined in claim 1 which contains a polyester selected from poly(ethylene terephthalate) or poly(butylene terephthalate), or mixtures thereof.

7. A blend as defined in claim 1 which contains a polyester derived from a cycloaliphatic diol and an aromatic dicarboxylic acid.

8. A blend as defined in claim 1 wherein the polyhydroxyether has the formula:

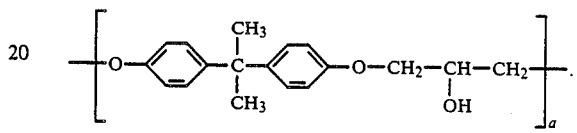

* * * * *

UNITED STATES PATENT OFFICE
CERTIFICATE OF CORRECTION

Patent No. 4,777,223　　　　　Dated October 11, 1988

Inventor(s) Lloyd M. Robeson

It is certified that error appears in the above-identified patent and that said Letters Patent is hereby corrected as shown below:

| Patent Column | Line | | |
|---|---|---|---|
| 2 | 6 | "2,2-bis" should read | --2,2-bis- -- |
| 2 | 6 | "(3,5-dimethyl 4-" should read | --(3,5-dimethyl-4- -- |
| 2 | 16 | "(3-phenyl 4-" should read | --(3-phenyl-4- -- |
| 2 | 18 | "(2-isopropyl-4" should read | --(2-isopropyl-4- -- |
| 2 | 22 | "1,2-bis (phenyl) propane," should read | --1,2-bis-(phenyl) propane-- |
| 2 | 35 | "contains. from" should read | --contains from-- |
| 5 | 26 | "cis" should read | -- cis- -- |
| 5 | 43 | "filters." should read | --fillers-- |
| 6 | 13 | "one inch" should read | --one-inch-- |

UNITED STATES PATENT OFFICE
CERTIFICATE OF CORRECTION

Patent No. 4,777,223　　　　　Dated October 11, 1988

Inventor(s) Lloyd M. Robeson

It is certified that error appears in the above-identified patent and that said Letters Patent is hereby corrected as shown below:

| Patent Column | Line | |
|---|---|---|
| Table III 1st Column | 12 | "Discription" should read --Description-- |
| 4 | 22 | |

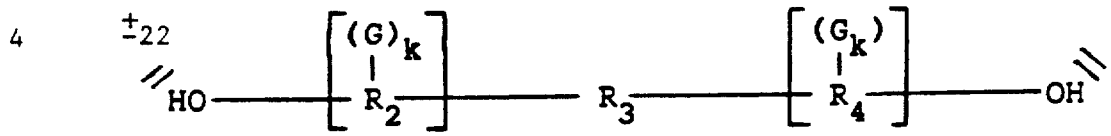

should read

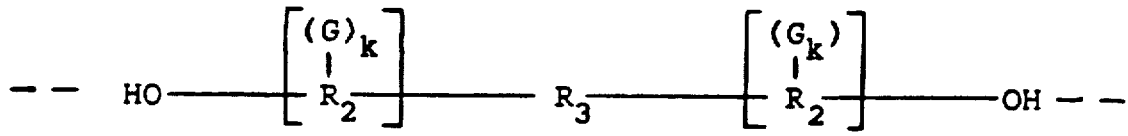

| 4 | 43 | "$R_4$" should read --$R_3$-- |

Signed and Sealed this

Fourth Day of July, 1989

Attest:

DONALD J. QUIGG

Attesting Officer　　Commissioner of Patents and Trademarks